(12) United States Patent
Bullock et al.

(10) Patent No.: US 6,246,868 B1
(45) Date of Patent: Jun. 12, 2001

(54) CONVERSION AND DISTRIBUTION OF INCOMING WIRELESS TELEPHONE SIGNALS USING THE POWER LINE

(75) Inventors: Scott R. Bullock, South Jordan; John M. Knab, Sandy, both of UT (US)

(73) Assignee: Phonex Corporation, Midvale, UT (US)

( * ) Notice: Subject to any disclaimer, the term of this patent is extended or adjusted under 35 U.S.C. 154(b) by 0 days.

(21) Appl. No.: 09/134,468

(22) Filed: Aug. 14, 1998

(51) Int. Cl.⁷ ........................................ H04M 9/00
(52) U.S. Cl. ...................... 455/402; 455/14; 455/572
(58) Field of Search ..................... 455/13.4, 14, 402, 455/572

(56) References Cited

U.S. PATENT DOCUMENTS

| | | |
|---|---|---|
| 2,510,273 | 6/1950 | Barstow et al. |
| 2,516,211 | 7/1950 | Hochgraf ........................ 179/3.5 |
| 2,516,763 | 7/1950 | Edson et al. ..................... 179/2.5 |
| 2,535,446 | 12/1950 | Mitchell .......................... 179/2.5 |
| 2,567,908 | 9/1951 | Levy ............................... 177/356 |
| 2,577,731 | 12/1951 | Berger ............................ 179/2.5 |
| 2,654,805 | 10/1953 | Deer ............................... 179/2.5 |
| 2,820,097 | 1/1958 | Finlay ............................. 179/2.5 |
| 2,828,363 | 3/1958 | Ray ................................ 179/2.5 |
| 2,932,794 | 4/1960 | Crow .............................. 328/156 |
| 3,045,066 | 7/1962 | Beuscher ........................ 179/2.5 |
| 3,280,259 | 10/1966 | Cotter ............................. 179/2.5 |
| 3,334,185 | 8/1967 | Marlot ............................ 179/2.5 |
| 3,369,078 | 2/1968 | Stradley .......................... 179/2.5 |
| 3,399,397 | 8/1968 | Josephson ....................... 340/216 |
| 3,400,221 | 9/1968 | Wolters ........................... 179/2.5 |
| 3,475,561 | 10/1969 | Krasin et al. .................... 179/15 |
| 3,521,267 | 7/1970 | Lester et al. .................... 340/310 |
| 3,529,216 | 9/1970 | Kolm et al. ..................... 317/147 |
| 3,659,280 | 4/1972 | Donohoo ........................ 340/310 |
| 3,693,155 | 9/1972 | Crafton et al. .................. 340/147 R |
| 3,810,096 | 5/1974 | Kabat et al. .................... 340/147 R |
| 3,818,481 | 6/1974 | Dorfman et al. ................ 340/310 R |
| 3,846,638 | 11/1974 | Wetherell ........................ 307/3 |
| 3,852,740 | 12/1974 | Haymes .......................... 340/416 |
| 3,876,984 | 4/1975 | Chertok .......................... 340/152 R |
| 3,911,415 | 10/1975 | Whyte ............................. 340/310 A |
| 3,922,664 | 11/1975 | Wadsworth ..................... 340/276 |
| 3,924,223 | 12/1975 | Whyte et al. .................... 340/310 R |
| 3,925,728 | 12/1975 | Whyte ............................. 324/142 |
| 3,925,763 | 12/1975 | Wadhwani et al. .............. 340/164 R |
| 3,942,168 | 3/1976 | Whyte ............................. 340/310 R |
| 3,949,172 | 4/1976 | Brown et al. .................... 179/2.5 R |
| 3,967,264 | 6/1976 | Whyte et al. .................... 340/310 A |
| 3,973,087 | 8/1976 | Fong ............................... 179/170 R |
| 3,980,954 | 9/1976 | Whyte ............................. 325/48 |
| 4,012,733 | 3/1977 | Whyte ............................. 340/310 A |

(List continued on next page.)

Primary Examiner—Daniel Hunter
Assistant Examiner—Thuan T. Nguyen
(74) Attorney, Agent, or Firm—Lloyd W. Sadler

(57) ABSTRACT

A method and system for the reception, conversion and distribution of wireless signals over AC power lines to one or more telephone communication devices within a building, office or complex is disclosed. This invention specifically provides for the reception of PCS, cellular and/or satellite communication signals, by receiving the wireless signal and providing an interface to standard generally available telephone equipment. By making use of the power line carrier channel, this invention provides for the reception of the wireless signals upon telephone equipment that is located in the building or complex in locations remote from standard telephone wiring. Moreover, by distributing such received wireless signals over the power line a number of telephone devices can be used to receive the distributed signals. This invention allows existing, or previously installed, telephones to communicate over and with wireless communication devices and provides a way to distribute these signals using power line telephone distribution methods, without requiring a change in existing wired telephone equipment.

13 Claims, 2 Drawing Sheets

U.S. PATENT DOCUMENTS

| | | | |
|---|---|---|---|
| 4,012,734 | 3/1977 | Jagoda et al. | 340/310 A |
| 4,016,429 | 4/1977 | Vercellotti et al. | 307/149 |
| 4,057,793 | 11/1977 | Johnson et al. | 340/310 R |
| 4,058,678 | 11/1977 | Dunn et al. | 179/2.5 R |
| 4,065,763 | 12/1977 | Whyte et al. | 340/310 R |
| 4,107,656 | 8/1978 | Farnsworth | 340/151 |
| 4,161,027 | 7/1979 | Russell | 364/492 |
| 4,173,754 | 11/1979 | Feiker | 340/310 R |
| 4,174,517 | 11/1979 | Mandel | 340/310 A |
| 4,218,655 | 8/1980 | Johnston et al. | 455/39 |
| 4,222,035 | 9/1980 | Lohoff | 340/167 R |
| 4,239,940 | 12/1980 | Dorfman | 179/2.51 |
| 4,254,403 | 3/1981 | Perez-Cavero et al. | 340/310 R |
| 4,307,380 | 12/1981 | Gander | 340/310 R |
| 4,321,581 | 3/1982 | Tappeiner et al. | 340/310 R |
| 4,323,882 | 4/1982 | Gajjar | 340/310 R |
| 4,344,066 | 8/1982 | Beggs | 340/310 A |
| 4,357,598 | 11/1982 | Melvin, Jr. | 340/310 A |
| 4,371,867 | 2/1983 | Gander | 340/310 R |
| 4,377,804 | 3/1983 | Suzuki | 340/310 A |
| 4,386,436 | 5/1983 | Kocher et al. | 455/151 |
| 4,400,688 | 8/1983 | Johnston et al. | 340/310 R |
| 4,408,185 | 10/1983 | Rasmussen | 340/310 A |
| 4,408,186 | 10/1983 | Howell | 340/310 A |
| 4,429,299 | 1/1984 | Kabat et al. | 340/310 R |
| 4,433,326 | 2/1984 | Howell | 340/310 A |
| 4,442,319 | 4/1984 | Treidl | 179/2 A |
| 4,471,399 | 9/1984 | Udren | 361/64 |
| 4,473,817 | 9/1984 | Perkins | 340/310 R |
| 4,475,193 | 10/1984 | Brown | 370/124 |
| 4,479,033 | 10/1984 | Brown et al. | 179/2.51 |
| 4,495,386 | 1/1985 | Brown et al. | 179/2.51 |
| 4,514,594 | 4/1985 | Brown et al. | 179/2.51 |
| 4,523,307 | 6/1985 | Brown et al. | 370/30 |
| 4,535,447 | 8/1985 | Rosanes et al. | 370/77 |
| 4,538,136 | 8/1985 | Drabing | 340/310 R |
| 4,556,864 | 12/1985 | Roy | 340/310 A |
| 4,556,865 | 12/1985 | Fukagawa et al. | 340/310 R |
| 4,556,866 | 12/1985 | Gorecki | 340/310 A |
| 4,559,520 | 12/1985 | Johnston | 340/310 R |
| 4,599,598 | 7/1986 | Komoda et al. | 340/310 A |
| 4,609,839 | 9/1986 | Howell | 307/542 |
| 4,611,274 | 9/1986 | Machino et al. | 364/200 |
| 4,633,218 | 12/1986 | Palsgrove et al. | 340/310 A |
| 4,638,298 | 1/1987 | Spiro | 340/827 |
| 4,638,299 | 1/1987 | Campbell | 340/310 A |
| 4,641,126 | 2/1987 | Crowe | 340/310 A |
| 4,641,322 | 2/1987 | Hasegawa | 375/1 |
| 4,642,607 | 2/1987 | Strom et al. | 340/310 A |
| 4,644,321 | 2/1987 | Kennon | 340/310 A |
| 4,675,648 | 6/1987 | Roth et al. | 340/310 A |
| 4,701,945 | 10/1987 | Pedigo | 379/66 |
| 4,745,391 | 5/1988 | Gajjar | 340/310 A |
| 4,745,392 | 5/1988 | Ise et al. | 340/310 R |
| 4,746,897 | 5/1988 | Shuey | 340/310 R |
| 4,749,992 | 6/1988 | Fitzemeyer et al. | 340/870.02 |
| 4,759,016 | 7/1988 | Otsuka | 370/95 |
| 4,763,103 | 8/1988 | Galula et al. | 340/310 R |
| 4,772,870 | 9/1988 | Reyes | 340/310 R |
| 4,774,493 | 9/1988 | Rabinowitz | 340/310 A |
| 4,783,780 | 11/1988 | Alexis | 370/95 |
| 4,788,527 | 11/1988 | Johansson | 340/310 A |
| 4,809,296 | 2/1989 | Braun et al. | 375/1 |
| 4,829,570 | 5/1989 | Schotz | 381/3 |
| 4,835,517 | 5/1989 | van der Gracht et al. | 340/310 A |
| 4,845,466 | 7/1989 | Hariton et al. | 340/310 R |
| 4,847,903 | 7/1989 | Schotz | 381/3 |
| 4,864,589 | 9/1989 | Endo | 375/1 |
| 4,866,733 | 9/1989 | Morishita | 375/1 |
| 4,890,089 | 12/1989 | Shuey | 340/310 A |
| 4,912,553 | 3/1990 | Pal et al. | 358/86 |
| 4,962,496 | 10/1990 | Vercellotti et al. | 370/11 |
| 4,963,853 | 10/1990 | Mak | 340/310 A |
| 4,968,970 | 11/1990 | LaPorte | 340/310 A |
| 4,988,972 | 1/1991 | Takagi | 340/310 A |
| 4,995,053 | 2/1991 | Simpson et al. | 375/1 |
| 5,003,457 | 3/1991 | Ikei et al. | 364/133 |
| 5,032,833 | 7/1991 | Laport | 340/825.02 |
| 5,049,876 | 9/1991 | Kahle et al. | 340/825.57 |
| 5,063,563 | 11/1991 | Ikeda et al. | 370/110.1 |
| 5,065,133 | 11/1991 | Howard | 340/310 A |
| 5,066,939 | 11/1991 | Mansfield, Jr. | 340/310 R |
| 5,068,890 | * 11/1991 | Nilssen | 455/402 |
| 5,136,612 | 8/1992 | Bi | 375/1 |
| 5,151,838 | 9/1992 | Dockery | 340/310 R |
| 5,155,466 | 10/1992 | Go | 340/310 R |
| 5,168,510 | 12/1992 | Hill | 375/40 |
| 5,187,865 | 2/1993 | Dolin, Jr. | 29/868 |
| 5,192,231 | 3/1993 | Dolin, Jr. | 439/620 |
| 5,210,518 | 5/1993 | Graham et al. | 340/310 R |
| 5,241,283 | 8/1993 | Sutterlin | 330/51 |
| 5,257,006 | 10/1993 | Graham et al. | 340/310 A |
| 5,262,755 | 11/1993 | Mak et al. | 340/310 R |
| 5,278,862 | 1/1994 | Vander Mey | 375/1 |
| 5,289,476 | 2/1994 | Johnson et al. | 371/37.1 |
| 5,319,634 | * 6/1994 | Bartholomew et al. | 455/402 |
| 5,327,230 | 7/1994 | Dockery | 348/8 |
| 5,349,644 | 9/1994 | Massey et al. | 395/200 |
| 5,351,272 | 9/1994 | Abraham | 375/38 |
| 5,355,114 | 10/1994 | Sutterlin et al. | 340/310 A |
| 5,357,541 | 10/1994 | Cowart | 375/1 |
| 5,404,127 | 4/1995 | Lee et al. | 340/310.02 |
| 5,406,248 | 4/1995 | Le Van Suu | 340/310.01 |
| 5,406,249 | 4/1995 | Pettus | 340/310.06 |
| 5,410,292 | 4/1995 | Le Van Suu | 340/310.06 |
| 5,412,369 | 5/1995 | Kirchner | 340/310.03 |
| 5,424,709 | 6/1995 | Tal | 340/310.01 |
| 5,448,593 | 9/1995 | Hill | 375/267 |
| 5,452,344 | 9/1995 | Larson | 379/107 |
| 5,461,629 | 10/1995 | Sutterlin et al. | 371/30 |
| 5,463,662 | 10/1995 | Sutterlin et al. | 375/351 |
| 5,467,011 | 11/1995 | Hunt | 324/67 |
| 5,471,190 | 11/1995 | Zimmermann | 340/310.01 |
| 5,504,454 | 4/1996 | Daggett et al. | 329/304 |
| 5,554,968 | 9/1996 | Lee | 340/310.01 |
| 5,559,377 | 9/1996 | Abraham | 307/104 |
| 5,630,204 | 5/1997 | Hylton et al. | 455/3.3 |
| 5,634,191 | * 5/1997 | Beasley | 455/14 |
| 5,787,336 | * 7/1998 | Hirschfield et al. | 455/13.4 |
| 5,832,364 | * 11/1998 | Gustafon | 455/402 |
| 5,930,684 | * 7/1999 | Keskitalo et al. | 455/13.4 |

* cited by examiner

CONVERSION AND DISTRIBUTION OF INCOMING WIRELESS TELEPHONE SIGNALS USING THE POWER LINE

BACKGROUND OF THE INVENTION

1. Field of the Invention

This invention relates to wireless telephone communications equipment. More specifically, this invention relates to equipment for receiving, converting and distributing wireless radio frequency signals using AC power line distribution channels.

2. Description of Related Art

A variety of power line carrier telephone voice and/or data communication systems have been developed and are used to facilitate telephonic communications in locations where little or no availability exists for dedicated telephone wires. While these devices provide a connection to the existing power lines they do not provide a means of distributing communication systems using standard "wired" telephone communication equipment and AC power line signal distribution. Such communication systems include: personal communication systems ("PCS's"); cellular telephone; and satellite telephone systems. The reader is directed to the following United States and foreign patent documents for background on power line communication systems: 2,510,273, 2,516,211, 2,516,763, 2,535,446, 2,567,908, 2,577,731, 2,654,805, 2,820,097, 2,828,363, 2,932,794, 3,045,066, 3,280,259, 3,334,185, 3,369,078, 3,399,397, 3,400,221, 3,475,561, 3,521,267, 3,529,216, 3,659,280, 3,693,155, 3,810,096, 3,818,481, 3,846,638, 3,852,740, 3,876,984, 3,911,415, 3,922,664, 3,924,223, 3,925,763, 3,925,728, 3,942,168, 3,949,172, 3,967,264, 3,973,087, 3,980,954, 4,012,733, 4,012,734, 4,016,429, 4,057,793, 4,058,678, 4,065,763, 4,107,656, 4,161,027, 4,173,754, 4,174,517, 4,218,655, 4,222,035, 4,239,940, 4,254,403, 4,307,380, 4,321,581, 4,323,882, 4,344,066, 4,357,598, 4,371,867, 4,377,804, 4,386,436, 4,400,688, 4,408,185, 4,408,186, 4,429,299, 4,433,326, 4,442,319, 4,471,399, 4,473,817, 4,475,193, 4,479,033, 4,495,386, 4,514,594, 4,523,307, 4,535,447, 4,538,136, 4,556,864, 4,556,865, 4,556,866, 4,559,520, 4,599,598, 4,609,839, 4,611,274, 4,633,218, 4,638,298, 4,638,299, 4,641,126, 4,641,322, 4,642,607, 4,644,321, 4,675,648, 4,701,945, 4,745,391, 4,745,392, 4,746,897, 4,749,992, 4,759,016, 4,763,103, 4,772,870, 4,774,493, 4,783,780, 4,788,527, 4,809,296, 4,829,570, 4,835,517, 4,845,466, 4,847,903, 4,864,589, 4,866,733, 4,890,089, 4,912,553, 4,962,496, 4,963,853, 4,968,970, 4,988,972, 4,995,053, 5,003,457, 5,032,833, 5,049,876, 5,063,563, 5,065,133, 5,066,939, 5,136,612, 5,151,838, 5,155,466, 5,168,510, 5,187,865, 5,192,231, 5,210,518, 5,241,283, 5,257,006, 5,262,755, 5,274,699, 5,278,862, 5,289,476, 5,319,634, 5,327,230, 5,349,644, 5,351,272, 5,355,114, 5,357,541, 5,404,127, 5,406,248, 5,406,249, 5,410,292, 5,412,369, 5,424,709, 5,448,593, 5,452,344, 5,461,629, 5,463,662, 5,467,011, 5,471,190, 5,504,454, 5,530,737, 5,530,741, 5,550,905, 5,554,968, 5,559,377, 5,630,204, GB 544,243, GB 549,948, GB 553,225, GB 683,265, GB 1,393,424, GB 2,094,598, AU-B1-12,488/76, Canada 1057436, Canada 1216689, EPO 0 078 171 A2, EPO 0 555 869 A2, PCT/US83/01717, PCTIUS90/02291, PCT/US90/06701, PCT/US92/08510, PCT/US93/04726, PCT/US94/031 10, and PCT/US95/00354 each of which is hereby incorporated by reference in its entirety for the material disclosed therein.

SUMMARY OF THE INVENTORY

It is desirable to provide a method, system and devices which enable the use of AC power line communication for the distribution of signals from a wide variety of communication sources and which is adapted to provide a seamless interface with standard telephone equipment.

Therefore, it is the general object of this invention to provide an interface between wireless communication devices, power line signal distribution, and standard telephone subscriber equipment.

It is a further object of this invention to provide a power line communication interface that is adapted to send and receive signals to and from personal communication systems ("PCS's").

It is a still further object of this invention to provide a power line communication interface that is adapted to send and receive signals to and from cellular telephone devices.

It is another object of this invention to provide a power line communication interface that is adapted to send and receive signals to and from satellite communication devices.

It is a further object of this invention to provide a power line communication interface that is adapted to cooperate with standard wired telephone communication systems as are commonly installed for residential, business and government users.

It is still another object of this invention to provide a power line communication interface that has a base station for communicating with the standard telephone lines and with a remote telephone unit, using standard AC power lines as the communication channel.

A further object of this invention is to provide a power line communication interface that uses spread spectrum modulation techniques to communicate between the various communication devices.

Another object of this invention is to provide a system for integrating wireless communication equipment with existing typical wired telephone equipment, thereby permitting the user to take advantage of new and evolving personal communication systems while continuing to use existing wired telephone equipment.

These and other objectives of this invention further described in this disclosure and are readily apparent to those of ordinary skill in the art upon review of the following drawings, detailed description and claims.

DETAILED DESCRIPTION OF THE INVENTION

This invention is a method and system for converting wireless communication signals and distributing such signals over established and/or standard telephone communication equipment. In essence, this invention is an interface that connects such communication devices as personal communication systems (PCS); cellular telephones, and satellite systems to typical wired telephone systems. In its preferred embodiment this invention comprises a base unit, a receiver, and an external conversion module which in combination with standard AC power line carrier lines and standard telephone equipment serves to permit existing telephones to use various wireless telephone signals and simultaneously provides a way to distribute these wireless telephone signals to standard telephone equipment using power line telephone distribution methods.

Figure 1:
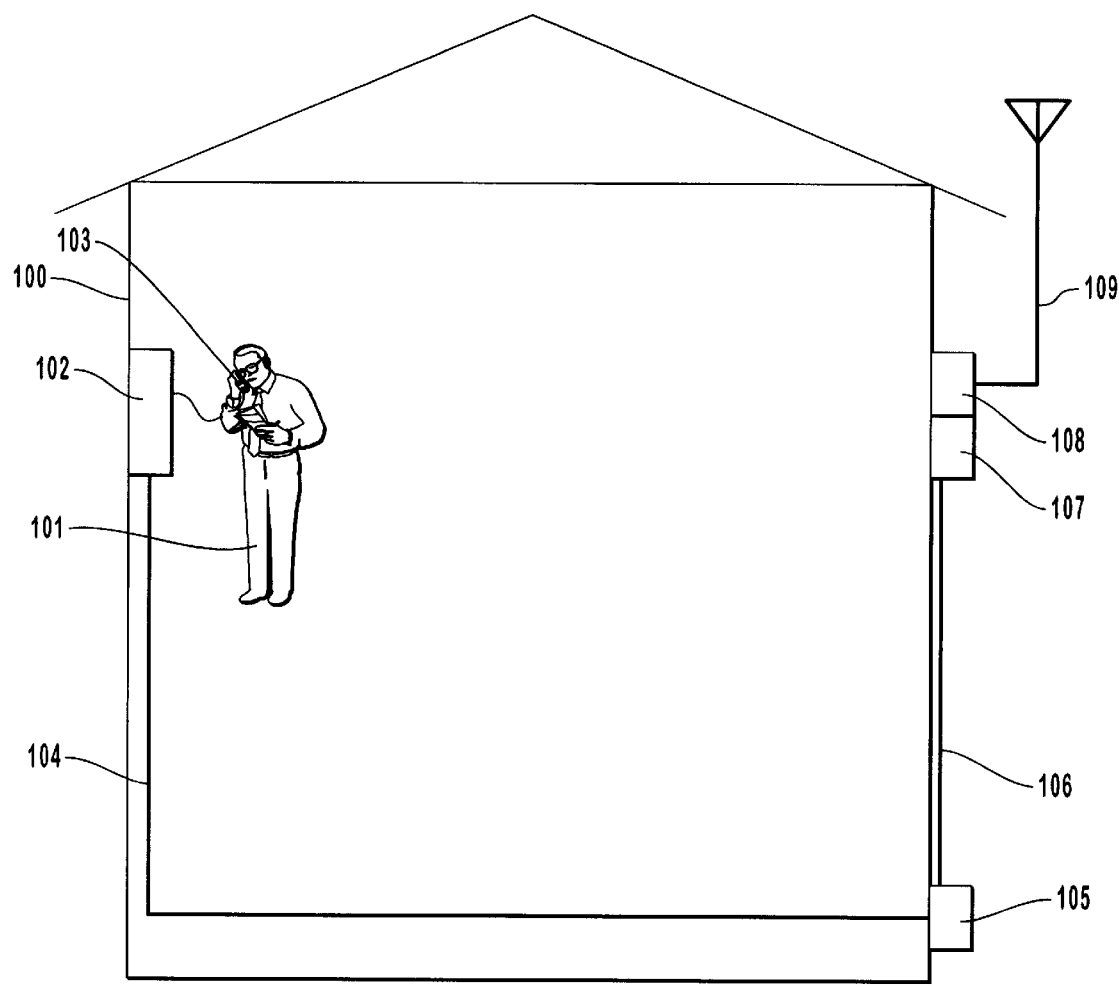
FIG. 1 is a representative drawing of a top level communication system using this invention.

FIG. 1 shows a top level representative drawing of a communication system employing this invention. The receiver 108 is mounted, typically on the outside, on the building 100, preferably near a power line distribution box 105. This receiver 108 is also connected to an antenna 109, which in turn is adapted to send and receive communication signals. Moreover, this receiver 108 is designed to receive standard wireless signals. Once a wireless signal is detected, it is converted to a signal appropriate to being coupled to the base unit (or power line transmitter) 107. The base unit 107 is typically embedded into the receiver 108 box or enclosure. The base unit 107 imposes the converted signal on the power line 104 via the power line distribution box 105. Also connected to the power line 104 are one or more extension units 102. Typically these extension units 102 are connected to the power line 104 by plugging each of them into a standard AC wall outlet. The extension unit 102 receives the power line signal which is transmitted from the base unit 107, processes the signal, converting the signal to be compatible with the standard and or existing subscriber telephone equipment 103, for use by the communication system user 101. The preferred receiver box 108 using the technology of the wireless provider, which typically is embedded into the receiver box 108 for despreading and demodulation of the RF signal transmission. The reader should note that although the description above focuses on receiving a signal from the receiver box 108 to the extension unit 102, the reverse signal transmission path is simultaneously supported, that is sending a signal from the extension unit 102 to the receiver box 108 for transmission.

Figure 2:
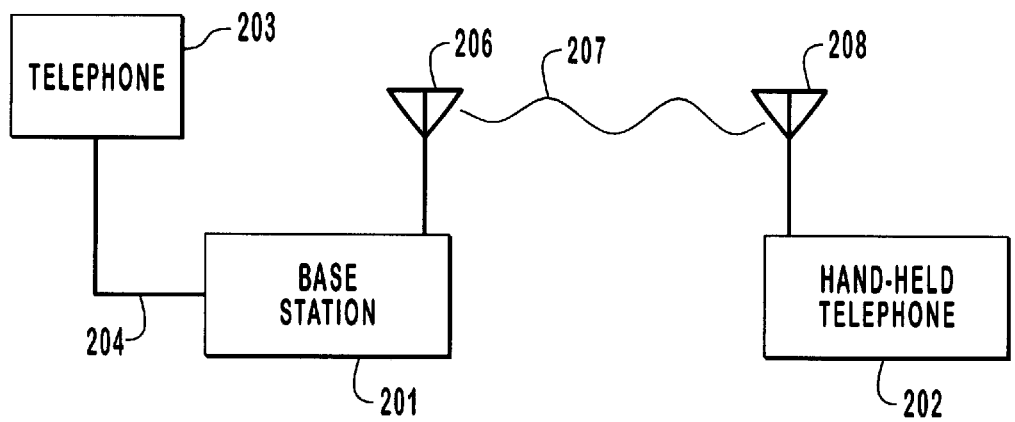
FIG. 2 depicts the standard PCS telephone communication system.

FIG. 2 shows the typical or standard PCS telephone communication system. A base station 201 is provided to receive the signal from the telephone 203 via the phone lines 204 and to then send out a spread spectrum signal 207 across the airwaves via an antenna 206. The transmitted spread spectrum signal 207 is received by a hand held telephone 202 having its own antenna 208. The preferred hand held telephone 202 is specifically designed to receive and demodulate the spread spectrum signals and thereby retrieve the audio signal. Several well established techniques have been developed for the spread spectrum signaling for the above described data line, including Direct Sequence (DS), Code Division Multiple Access (CDMA), Time Division Multiple Access (TDMA) and Frequency Division Multiple Access (FDMA). The modulation frequencies are to perform in the ISM bands that have been allocated by the FCC for use with spread spectrum systems. The typical hand held telephone 202 is selected by the user 101. Alternatively, a pre-existing telephone system, such as is commonly used with business communication systems and/pr apartment complexes, is incorporated with the PCS system described above.

Figure 3:
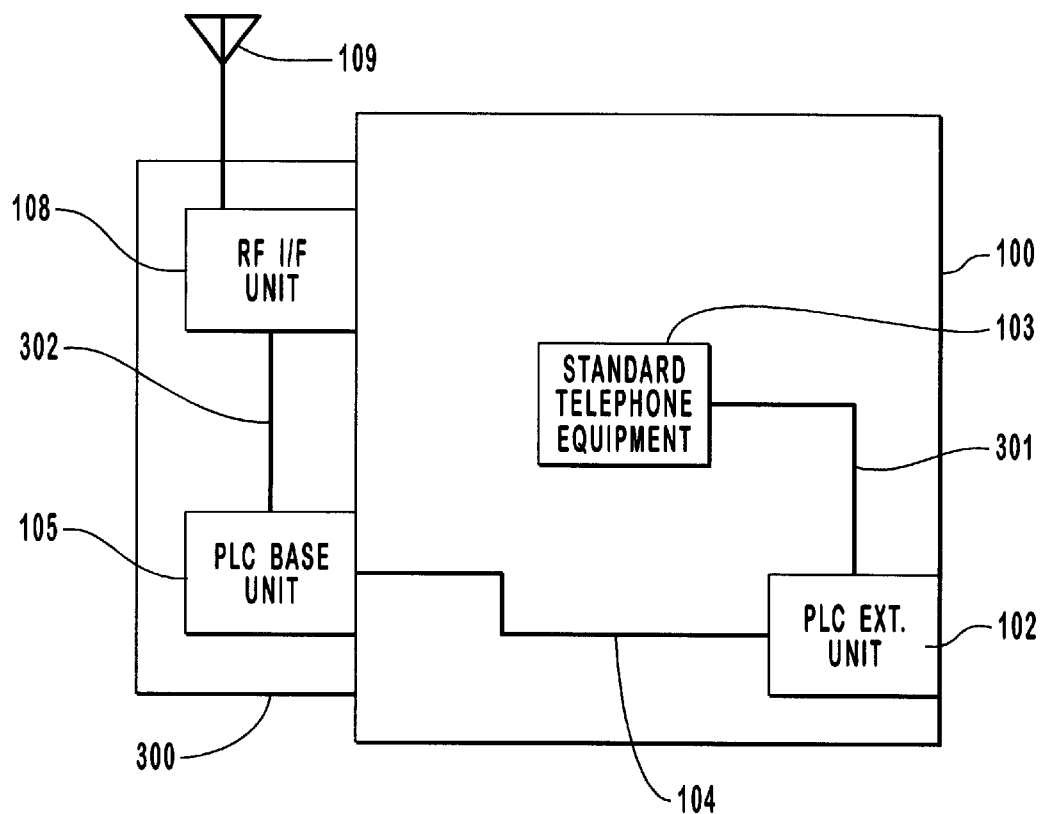
FIG. 3 depicts the preferred components and connections used in the distribution of wireless communication signals to standard telephone equipment in this invention.

FIG. 3 shows the preferred embodiment of invention depicting the components and connections used in the distribution of wireless communication signals to standard telephone equipment in this invention. An external conversion module 300 interfaces directly to the RF signals received from the antenna 109 to convert the incoming signals to the standard telephone signals. The RF signals, including PCS, Cellular and Satellite signals, enter the invention via the external antenna 109 on the external conversion module 300. The preferred external conversion module 300 comprises an RF Interface unit 108 and a Power Line Carrier (PLC) base unit 105 to interface and both send and receive signals via the power line 104. These power line signals are received (or sent) by the extension unit 102 via the telephone lines 301 which interface directly to the existing or standard telephone equipment 103. This provides system provides the capability of using and distributing the existing telephone equipment with the wireless RF incoming signals, thereby providing the user with the ability to receive PCS signals anywhere in the building 100 where power outlets are available.

The described embodiment of this invention is to be considered in all respects only as illustrative and not as restrictive. Although, this embodiment of the invention describes voice telephone equipment, it alternatively can also be applied to electronic (computer modem) communication. Also, although this described embodiment of the invention identifies the use of certain well known modulation techniques, it is not intended to be limited thereto. Rather, this invention may alternatively employ other similar, currently known or developed in the future, modulation techniques. Similarly, this invention is not limited to specific components, and the substitution of alternative equivalent components should be considered within the scope of this invention. The scope of this invention is indicated by the appended claims rather than by the foregoing description. All changes which come within the meaning and range of equivalency of the claims are to be embraced within their scope.

We claim:

1. A system for the conversion and distribution of wireless telephone signals comprising:

(A) an external conversion module, adapted to receive RF signals, convert (TN) said received RF signals for power line communications, interface with a power line, receive communication signals from the power line, convert said received communication signals for RF (over-the-air) communications and transmits such RF signals, said external conversion module further comprising: an RF receiver, receiving RF signals, wherein said RF signals include personal communication system signals, cellular telephone signals and satellite signals; and a power line base unit, providing an interface between said RF receiver and an AC power line communication channel, electrically connected to said RF receiver;

(B) an AC power line electrically connected to said power line base unit;

(C) a power line extension unit, for receiving signals transmitted by said power line transmitter, electrically connected to said AC power line; and (D) a telephone communication device electrically connected to said power line extension unit for use by a telephone user in communicating information with another telephone user.

2. A system for the conversion and distribution of wireless telephone signals, as recited in claim 1, wherein said power line base unit further comprises a spread spectrum modulator.

3. A system for the conversion and distribution of wireless telephone signals, as recited in claim 2, wherein said spread spectrum modulation is selected from the group consisting of direct sequence, code division multiple access, time division multiple access, and frequency division multiple access.

4. A system for the conversion and distribution of wireless telephone signals, as recited in claim 2, wherein said spread spectrum modulation is adapted to operate in the ISM bands.

5. A system for the conversion and distribution of wireless telephone signals, as recited in claim 1, wherein said power line is a standard 110 v AC power line.

6. A system for the conversion and distribution of wireless telephone signals, as recited in claim 1, wherein said power line is a standard 220 v AC power line.

7. A system for the conversion and distribution of wireless telephone signals, as recited in claim 1, wherein said extension unit connects to said AC power line using a standard AC wall plug.

8. A system for the conversion and distribution of wireless telephone signals, as recited in claim 1, wherein said extension unit further comprises a demodulator.

9. A system for the conversion and distribution of wireless telephone signals, as recited in claim 1, wherein said extension unit further comprises a receiver.

10. A system for the conversion and distribution of wireless telephone signals, as recited in claim 1, wherein said telephone communication device further comprises a microphone.

11. A system for the conversion and distribution of wireless telephone signals, as recited in claim 1, wherein said telephone communication device further comprises a speaker.

12. A system for the conversion and distribution of wireless telephone signals, as recited in claim 1, wherein said telephone communication device further comprises a means for inputting the telephone number to be called.

13. A system for the conversion and distribution of wireless telephone signals, as recited in claim 1, further comprising an antenna for receiving a wireless signal, wherein said antenna is electrically connected to said RF receiver.

* * * * *